L. W. STILES.
BUTTER WORKER.
No. 28,312.            Patented May 15, 1860.
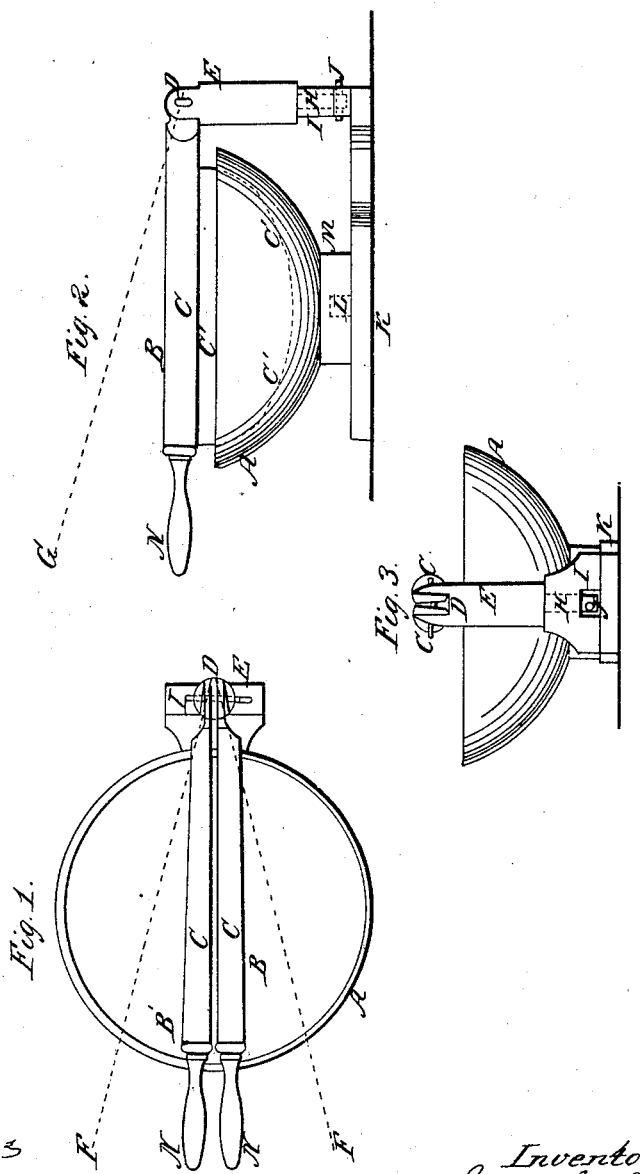
Witnesses;
W. H. Burroughs
Henry Voth
Inventor;
Lydia W. Stiles

UNITED STATES PATENT OFFICE.

LYDIA W. STILES, OF BROOKLYN, OHIO.

BUTTER-WORKER.

Specification of Letters Patent No. 28,312, dated May 15, 1860.

*To all whom it may concern:*

Be it known that I, LYDIA W. STILES, of Brooklyn, in the county of Cuyahoga and State of Ohio, have invented a new and useful Improvement in a Kneading-Bowl and Butter-Worker Combined, and do hereby declare that the following is a full and complete description of the construction and operation of the same, reference being had to the accompanying drawings, making part of this specification, in which—

Figure 1, is a top view. Fig. 2, is a side view. Fig. 3, is an end view.

Like letters denote like parts in the different views.

The nature of my improvement relates to a special arrangement of a bowl and workers which are jointed, or hinged to a moveable standard, so as to allow these workers to be moved in any desired direction in the bowl, by means of which, dough may be kneaded, or butter worked, with much more ease, and facility than it can be done by hand. A, represents a bowl, which may be of any convenient form, with which is connected two workers B, B′, that move about in the bowl. These workers consist, each of an arm and blade C and C′, or kneading board C′. The arms are hinged at D, Fig. 1, to the movable post E, Fig. 2. The joint at D, consists of a pin passing through the ears or lugs at the top of the post, and the ends of the arms C, which are placed between the ears or lugs of the post, as in Figs. 1 and 3. The ends of the arms at D, are tapered, or rounded off on the inside face, which in connection with the joint D, and movable standard, allows the workers to be moved in the direction of the dotted lines F, Fig. 1, and also allows the workers to be moved up and down in the direction of the dotted line G, Fig. 2.

From the lower end of the standard E, extends an arm, or stem indicated at H, Figs. 2 and 3. This arm passes down through the stand I, to allow a pin J, to pass through it. Other suitable means may be employed, to prevent the standard from raising out of the stand I. The arm H, is so fitted into the stand, as to allow the standard to turn easily, which allows the arms to be moved in the direction of the lines F, F.

The bowl A, is placed upon the platform K, Fig. 2, from which extends a pin L, which fits into a socket in the piece M, upon which the bowl revolves. The piece M, and the bowl are firmly connected together. By having the bowl revolve, the inside may be scraped, or cleaned by holding one of the blades, to the side of the bowl as it turns. And also by turning the bowl or tray, all the dough, butter, &c., may be easily brought under the action of the workers.

In using the workers, the person takes hold of the handles N, N, and presses the blades into the material in the bowl, and by turning the bowl, all parts of the contents are brought in contact with the workers, and by opening the workers in the direction, of the lines F, F, then by bringing them together, the dough, butter, or any other substance, is pressed between the blades, which in working butter is very desirable. By raising the workers in the direction of the line G, then moving the workers toward F, the blades may be brought in contact with the rim of the bowl, so that all parts of the bowl may be acted upon by the workers, and all the contents may be readily brought under the action of the blades. These blades are curved as indicated in Fig. 2. The curved edges of the blades are a little less in diameter, than the circumference of the bowl, so that when the blades are raised and moved sidewise the upper rim of the bowl may be acted upon by the blades. These blades are about half an inch thick, and their sides are parallel with each other. The joint D, acts, also as a fulcrum, so that the force applied to the handles N, N, in using the workers, may be much more effectually employed in kneading dough, and working butter, than if the hands were directly engaged in working the said material. Thus with my improvement, the dough may be worked in much less time than by hand, and with far less labor, and it is much neater than working it by hand. The same practical advantages are experienced in working butter, and the improvement is applicable to other obvious uses besides those herein before mentioned.

What I claim as my improvement and desire to secure by Letters Patent, is—

The special arrangement of the workers B, B′; hinged to the adjustable post E, in combination with the revolving bowl, when operating conjointly, in the manner, and for the purpose set forth.

LYDIA W. STILES.

Witnesses:
W. H. BURRIDGE,
HENRY VOTH.